(12) United States Patent
Amano (10) Patent No.: US 7,714,922 B2
(45) Date of Patent: May 11, 2010

(54) IMAGING DEVICE AND IMAGING METHOD (75) Inventor: Ryousuke Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 10/523,159

(22) PCT Filed: May 27, 2004

(86) PCT No.: PCT/JP2004/007664

§ 371 (c)(1),
(2), (4) Date: Jan. 27, 2005

(87) PCT Pub. No.: WO2004/107741

PCT Pub. Date: Dec. 9, 2004

(65) Prior Publication Data

US 2006/0050165 A1    Mar. 9, 2006

(30) Foreign Application Priority Data

May 30, 2003    (JP)    ............................. 2003-155677

(51) Int. Cl.
*H04N 5/222* (2006.01)
(52) U.S. Cl. ...................... 348/320; 348/294
(58) Field of Classification Search ................ 348/320, 348/319, 307, 222.1, 305, 308, 317, 323
See application file for complete search history.

(56) References Cited

U.S. PATENT DOCUMENTS

| | | | | |
|---|---|---|---|---|
| 5,019,911 A | * | 5/1991 | Okino et al. ............. | 348/220.1 |
| 5,187,584 A | * | 2/1993 | Nishiki et al. ............ | 348/319 |
| 5,262,871 A | * | 11/1993 | Wilder et al. ............. | 348/307 |
| 5,382,974 A | * | 1/1995 | Soeda et al. ............. | 348/221.1 |
| 5,430,481 A | * | 7/1995 | Hynecek .................. | 348/317 |

(Continued)

FOREIGN PATENT DOCUMENTS

EP    0 794 662    9/1997

(Continued)

*Primary Examiner*—Lin Ye
*Assistant Examiner*—Amy Hsu
(74) *Attorney, Agent, or Firm*—Frommer Lawrence & Haug LLP; William S. Frommer; Ellen Marcie Emas (57) ABSTRACT

The present invention is directed to an image pick-up apparatus adapted for picking up image of object, which comprises a solid-state image pick-up device (1) for performing photo-electric conversion in accordance with a received image pick-up light, a switching unit (10) for performing switching between first mode serving as image pick-up mode where charges stored in the solid-state image pick-up device (1) are read out every n (n is natural number) frames and second mode serving as image pick-up mode where charges stored in the solid-state image pick-up device (1) are read out every m (m is natural number) fields to add odd charges and even charges which are adjacent in a vertical direction of the charges which have been read out while changing the combination thereof every m fields to provide an output, and a control unit (9) for controlling the switching unit (10) in such a manner to switch the image pick-up mode into the first mode in accordance with image pick-up request at low output sensitivity, and to switch the image pick-up mode into the second mode in accordance with image pick-up request at high output sensitivity.

8 Claims, 6 Drawing Sheets

U.S. PATENT DOCUMENTS

| | | | |
|---|---|---|---|
| 5,444,484 A * | 8/1995 | Yutani et al. | 348/305 |
| 5,471,243 A * | 11/1995 | Suzuki et al. | 348/234 |
| 5,712,680 A * | 1/1998 | Hieda | 348/220.1 |
| 5,828,407 A * | 10/1998 | Suzuki | 348/312 |
| 5,923,367 A * | 7/1999 | Tsunekawa et al. | 348/207.99 |
| 6,078,685 A * | 6/2000 | Kawai et al. | 382/167 |
| 6,515,703 B1 * | 2/2003 | Suzuki et al. | 348/317 |
| 6,970,191 B1 * | 11/2005 | Sase et al. | 348/220.1 |
| 7,015,965 B2 * | 3/2006 | Asada et al. | 348/312 |
| 7,106,374 B1 * | 9/2006 | Bandera et al. | 348/308 |
| 2001/0024237 A1 | 9/2001 | Osada et al. | |
| 2002/0057349 A1 | 5/2002 | Yamaguchi et al. | |

FOREIGN PATENT DOCUMENTS

| | | |
|---|---|---|
| JP | 63 99681 | 4/1988 |
| JP | 1 146 476 | 6/1989 |
| JP | 2000-188763 | 7/2000 |
| JP | 2002-142151 | 5/2002 |

\* cited by examiner

FIG. 1

| GAIN QUANTITY | OPERATION MODE |
|---|---|
| 0 dB | 1 |
| 6 dB | 1 |
| 12 dB | 1 |
| 18 dB | 2 |
| 24 dB | 2 |
| 30 dB | 2 |

FIG.2

| NO. OF ACCUMULATED FRAMES | OPERATION MODE |
|---|---|
| 1 | 1 |
| 2 | 1 |
| 4 | 1 |
| 8 | 1 |
| 16 | 2 |
| 32 | 2 |
| 64 | 2 |

FIG.3

| | | NO. OF ACCUMULATED FRAMES | | | | | | |
|---|---|---|---|---|---|---|---|---|
| | | 1 | 2 | 4 | 8 | 16 | 32 | 64 |
| GAIN QUANTITY | 0 dB | 1 | 1 | 1 | 1 | 1 | 1 | 2 |
| | 6 dB | 1 | 1 | 1 | 1 | 1 | 2 | 2 |
| | 12 dB | 1 | 1 | 1 | 1 | 2 | 2 | 2 |
| | 18 dB | 1 | 1 | 1 | 2 | 2 | 2 | 2 |
| | 24 dB | 1 | 2 | 2 | 2 | 2 | 2 | 2 |
| | 30 dB | 2 | 2 | 2 | 2 | 2 | 2 | 2 |

FIG.4

FIG. 5A  FRAME SYNC SIGNAL
FIG. 5B  FIELD 1/2 DISCRIMINATION
FIG. 5C  CCD OPERATION MODE
FIG. 5D  Readout_Mask
FIG. 5E  Readout
FIG. 5F  Readout
FIG. 5G  CCD OUTPUT IMAGE
FIG. 5H  MEMORY OPERATION
FIG. 5I  IMAGE SIGNAL PROCESSING BLOCK INPUT IMAGE

FIG.8A FRAME SYNC SIGNAL

FIG.8B FIELD 1/2 DISCRIMINATION

FIG.8C CCD OPERATION MODE

FIG.8D Readout_Mask

FIG.8E Readout

FIG.8F Readout

FIG.8G CCD OUTPUT IMAGE

FIG.8H MEMORY OPERATION

FIG.8I IMAGE SIGNAL PROCESSING BLOCK INPUT IMAGE

IMAGING DEVICE AND IMAGING METHOD

TECHNICAL FIELD

The present invention relates to an image pick-up apparatus using a solid-state image pick-up device, and more particularly to an image pick-up apparatus and an image pick-up method which are adapted for picking up an image of an object at high sensitivity.

This Application claims priority Japanese Patent Application No. 2003-155677, filed on May 30, 2003, the entirety of which is incorporated by reference herein.

BACKGROUND ART

Hitherto, there are used image pick-up apparatuses using CCD (Charge Coupled Device) type image pick-up device as solid-state image pick-up device. The image pick-up apparatuses of this kind are adapted to control read-out timings of charges stored (accumulated) in the CCD image pick-up device to thereby increase charge storage time of charges stored in the CCD image pick-up device to perform long time exposure thus to have ability to pick up an image of an object at high density.

For a time period during which charges are being stored into the CCD type image pick-up device for the purpose of performing long time exposure, it is impossible to read out charges from the CCD type image pick-up device. Accordingly, images temporarily stored in a memory are outputted for charge storage time period of the CCD type image pick-up device to perform complementary processing of such image.

Techniques as described below are proposed in regard to complementary processing of image for long time exposure period.

First, in the Japanese Patent Application Laid Open No. 1997-168118 publication, there is proposed a technique of reading out charges on one field basis from the CCD type image pick-up device to store images of one field (one even field or one odd field) into a memory (field memory), and to read out images of one field from the memory for a long time exposure period to perform complementary processing of such image.

Moreover, in the Japanese Patent Application Laid Open No. 1997-252423 publication, there is proposed a technique of reading out charges on one frame basis by the so-called frame read-out operation from the CCD type image pick-up device to store images of one frame into a memory (frame memory) to read out images of odd field from the memory at a timing where image of odd field is outputted for a long time exposure period to perform complementary processing of such image, and to read out images of even field from the memory at a timing where image of even field is read out during such time period to perform complementary processing of such image.

In the technique described in the Japanese Patent Application Laid Open No. 1997-168118 publication, images of even field or odd field are stored into a field memory to read out the images of even field or odd field stored in the field memory at the time of long time exposure to perform complementary processing thereof. Accordingly, in the case where this technique is applied to equipments based on the existing television standard in which interlaced scanning is performed, there is the problem that since the same images would be outputted both at even field and at odd field as image at the time of long time exposure, vertical resolution is halved so that this technique is not practically useful with respect to moving images.

In addition, at both the techniques described in the Japanese Patent Application Laid Open No. 1997-168118 publication and the Japanese Patent Application Laid Open No. 1997-252423 publication, since it is necessary for picking up image of object at a high sensitivity to elongate charge storage time of the CCD type image pick-up device, there would result image having large movement or vibration with respect to moving object. Even if focusing adjustment is made, or adjustment of brightness is performed in order to eliminate such movement or vibration, time lag with respect to adjustment takes place because complementary processing is performed by stored images. Thus, adjustment becomes very difficult. As a result, it is impossible to acquire an image having picture quality such that user expects even if sensitivity is raised.

DISCLOSURE OF THE INVENTION

An object of the present invention is to provide a novel image pick-up apparatus and a novel image pick-up method which can solve problems that prior arts have.

Another object of the present invention is to provide an image pick-up apparatus and an image pick-up method in which in the case where image of high picture quality is required, an image of an object is picked up at an output sensitivity that user requests without lowering picture quality, while in the case where high output sensitivity is required, an image of an object is picked up at an output sensitivity that user requests in the state where lowering of picture quality is held down to a minimum value.

The image pick-up apparatus according to the present invention comprises: a solid-state image pick-up device for performing photo-electric conversion in accordance with a received image pick-up light; switching means for performing switching between first mode serving as image pick-up mode where charges stored in the solid-state image pick-up device are read out every n (n is natural number) frames to output a CCD (Charge Coupled Device) output signal and second mode serving as image pick-up mode where charges stored in the solid-state image pick-up device are read out every m (m is natural number) fields to add odd charges and even charges which are adjacent in a vertical direction of the charges which have been read out while changing the combination thereof every m fields to output a CCD (Charge Coupled Device) output signal; and control means for controlling the switching means in such a manner to switch the image pick-up mode of the image pick-up apparatus into the first mode in accordance with image pick-up request at a low output sensitivity, and to switch the image pick-up mode of the image pick-up apparatus into the second mode in accordance with image pick-up request at a high output sensitivity.

In addition, the image pick-up method according to the present invention comprises: performing photoelectric conversion by a solid-state image pick-up device in accordance with a received image pick-up light; performing switching into first mode serving as image pick-up mode where charges stored in the solid-state image pick-up device are read out every n (n is natural number) frames in accordance with image pick-up request at a low output sensitivity to output a CCD (Charge Coupled Device) output signal; and performing switching into second mode serving as image pick-up mode where charges stored in the solid-state image pick-up device are read out every m (m is natural number) fields in accordance with image pick-up request at a high output sensitivity to add odd charges and even charges which are adjacent in a vertical direction of the charges which have been read out while changing the combination thereof every m fields to output a CCD (Charge Coupled Device) output signal, thus to perform image pick-up operation.

Still further objects of the present invention and practical merits obtained by the present invention will become more apparent from the description of the embodiments which will be given below with reference to the attached drawings.

BEST MODE FOR CARRYING OUT THE INVENTION

An image pick-up apparatus and an image pick-up method according to the present invention will now be described in detail with reference to the attached drawings.

First, image pick-up apparatus 20 according to the present invention will be explained with reference to FIG. 1.

Figure 1:
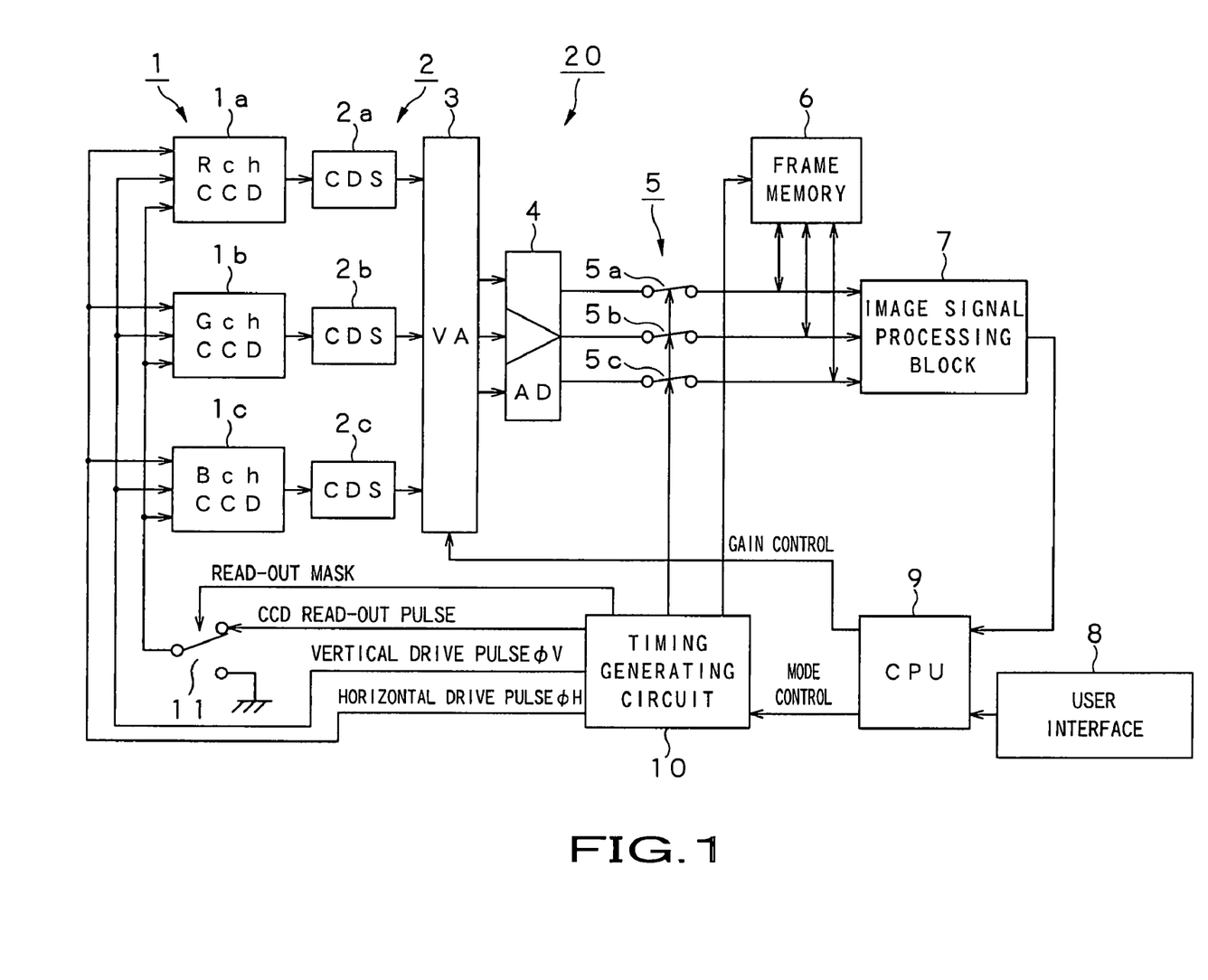
FIG. 1 is a block diagram showing the configuration of an image pick-up apparatus according to the present invention.

The image pick-up apparatus 20 according to the present invention comprises, as shown in FIG. 1, a CCD type image pick-up device 1, a CDS 2 composed of CDSs (Correlated Double Sampling circuits) 2a, 2b, 2c, a gain variable amplifier 3, an A/D (Analog to Digital) converter 4, a bus switch 5 composed of bus switch elements 5a, 5b, 5c, a frame memory 6, an image signal processing block 7, a user interface 8, a CPU (Central Processing Unit) 9, a timing generating circuit (timing generator) 10, and a switch 11.

The CCD type image pick-up device 1 is a three CCD type image pick-up device comprising three CCDs 1a, 1b, 1c. Although not shown, at the preceding stage of the CCD type image pick-up device 1, there is provided dichroic prism adapted for allowing rays of incident light incident from image pick-up lens (not shown) to be transmitted therethrough or reflected thereon to perform color separation. R (Red) light rays, G (green) light rays and B (Blue) light rays having different wavelength regions which have been color-separated by the dichroic prism are respectively incident on the respective CCDs 1a, 1b, 1c.

The CCDs 1a, 1b, 1c are adapted so that plural pixels each comprised of photo-electric converting element such as photo-diode, etc. are two-dimensionally arranged, and serve to perform photo-electric conversion of rays of incident light on pixel basis by the photo-electric converting elements to store charges corresponding to light quantities. Moreover, the CCDs 1a, 1b, 1c perform vertical transfer of stored charges, and further perform horizontal transfer thereof to thereby output charges every one line of the two-dimensional array. The charges which have been outputted from the CCDs 1a, 1b, 1c are respectively delivered to CDSs 2a, 2b, 2c as CCD output signals.

The charges which have been stored in the CCDs 1a, 1b, 1c are read out by frame read-out operation or field read-out operation.

The frame read-out operation is a technique of reading out charges which have been stored for one frame time period, i.e., 1/30 sec. in the two-dimensionally arranged photo-diodes of the CCDs 1a, 1b, 1c. In the frame read-out operation, charges which have been stored at alternative pixels of odd number (odd lines) are read out in a vertical direction of the two-dimensionally arranged photo-diodes as CCD output signals corresponding to video signals of odd field, and charges which have been stored at the remaining pixels of even number (even lines) are read out as CCD output signals corresponding to video signals of even field.

On the other hand, the field read-out operation is a technique of reading out charges which have been stored for one field time period, i.e., 1/60 sec. in the two-dimensionally arranged photo-diodes of the CCDs 1a, 1b, 1c. In the field read-out operation, charges which have been read out from pixels of odd lines and pixels of even lines which are adjacent of the two-dimensionally arranged photo-diodes and have been added are caused to be CCD output signals corresponding to video signals of odd field, and charges which have been read out from pixels of odd lines and pixels of even lines which are adjacent and have been added while changing the combination thereof are caused to be CCD output signals corresponding to video signals of even field.

In the frame read-out operation, since charges of respective pixels are independently read out, vertical resolution is advantageously high to a little degree as compared to the field read-out operation in which added charges of two pixels are outputted. In addition, in the frame read-out operation, since storage time of charges stored at respective pixels takes a value of the order of 1/30 sec. which is twice greater than 1/60 sec. of the charge storage time in the filed read-out operation, when object is moved, or the image pick-up apparatus 20 is panned, there is the problem that picture quality is deteriorated by the so-called frame after-image, which is phenomenon in which previous image is left so that it appears as after-image.

On the contrary, in the field read-out operation, since read-out interval of charges stored at respective pixels, i.e., charge storage time is 1/60 sec. which is a value 1/2 times greater than that of the frame read-out operation, there results less frame after-image. For this reason, there is the merit that moving resolution is excellent as compared to that of the frame read-out operation. In addition, in the field read-out operation, since added charges of two pixels are outputted, vertical resolution is inferior as compared to the frame read-out operation at the time of long time exposure. However, since double charges are read out in the same charge storage time, image of high sensitivity can be advantageously obtained.

In the following description, the mode where charges are read out by frame read-out operation from the CCDs 1a, 1b, 1c is called the first mode, and the mode where charges are read out by the field read-out operation is called the second mode.

At the CCDs 1a, 1b, 1c in which stored (accumulated) charges are read out by the frame read-out operation or the field read-out operation in this way, it is possible to perform long time exposure in which each storage time of charges caused to be stored into two-dimensionally arranged photo-diodes is caused to be a value which is a multiple of a natural number of the shortest storage time in respective read-out modes.

Namely, in the frame read-out operation which is the first mode, storage time of charges caused to be stored into photo-iodes can be set to 1/30 sec.×n (n is natural number). In the field read-out operation which is the second mode, storage time of charges can be similarly set to 1/60 sec.×m (m is natural number).

When long time exposure is performed, it becomes possible to pick up, at a higher picture quality, an image of an object having less movement under the condition where light quantity is small, and/or to pick up, at a higher sensitivity, an image of object which could not be primarily picked up because of shortage of light quantity. However, when long time exposure is performed with respect to an object having large movement, after-image would take place so that picture quality is deteriorated.

In the case where long time exposure is performed by the image pick-up apparatus 20 according to the present invention, whether charges are read out by the frame read-out operation which is the first mode or charges are read out by the field read-out operation which is the second mode in accordance with exposure time designated (instructed) from a user is determined by the CPU 9. Thus, read-out control operations of charges corresponding to respective modes are executed by the timing generating circuit 10.

The CDSs 2a, 2b, 2c remove noises included in CCD output signals outputted from the CCDs 1a, 1b, 1c to generate video signals. The video signals from which noises have been removed at the CDSs 2a, 2b, 2c are delivered to the gain variable amplifier 3.

The gain variable amplifier 3 adjusts gains of the video signals which have been delivered from the CDSs 2a, 2b, 2c in accordance with request from user inputted through user interface 8 which will be described later. For example, in the case where an object has sufficient brightness, user makes a request for lowering (decreasing) gain in order to acquire image of high picture quality having less noise, and in the case where brightness of an object is insufficient, user makes a request for increasing gain in such a manner that picking up of an image of the object is caused to be preferential although noises become many.

The video signals which have been gain-adjusted at the gain variable amplifier 3 are delivered to the A/D converter 4.

The A/D converter 4 serves to convert analog video signals which have been delivered from the gain variable amplifier 3 into digital video signals. The A/D converter 4 outputs the digital video signals thus converted to the bus switch 5.

The bus switch 5 serves to turn the switch elements ON or OFF in accordance with control by the timing generating circuit 10 to control output to the frame memory 6 and the image signal processing block 7 of the digital video signal delivered from the A/D converter 4.

When long time exposure is performed at the CCDs 1a, 1b, 1c, the bus switch 5 is controlled during charge storage time period so that it is turned OFF because charges are not read out from the respective CCDs 1a, 1b, 1c, and is controlled so that it is turned ON when charge storage time is completed. When the bus switch 5 is turned ON, digital video signal outputted from the A/D converter 4 is delivered to the frame memory 6 and the image signal processing block 7.

The frame memory 6 is a SDRAM (Synchronous Dynamic Random Access Memory) having a predetermined capacity, and is adapted so that digital video signals delivered through the bus switch 5 from the A/D converter 4 are stored therein. The digital video signals stored in the frame memory 6 are video signals for performing complementary processing for charge storage time period in performing long time exposure, i.e., for a time period during which there is no read-out operation of charges from the respective CCDs 1a, 1b, 1c.

The image signal processing block 7 implements luminance signal processing, color signal processing, contour correction processing and encode processing to digital video signals delivered through the bus switch 5 from the A/D converter 4 or digital video signals for complementary processing which have been read out from the frame memory 6 to perform DA (digital to analog) conversion to output the analog signals thus obtained as analog luminance signal and chromaticity signal.

The user interface 8 serves to input request from user, and comprises operation buttons for operating various functions of the image pick-up apparatus 20, and a display unit such as LCD (Liquid Crystal Display), etc. For example, GUI (Graphic User Interface) which supports operations of various functions of the image pick-up apparatus 20 is displayed on the LCD. Thus, user inputs image pick-up start command for starting image pick-up operation and/or image pick-up stop command, etc. in accordance with the GUI.

Moreover, it is possible to input, from the user interface 8, gain quantity with respect to video signal, which is adjusted at the above-described gain variable amplifier 3.

Furthermore, it is also possible to input exposure time from the user interface 8 in the case where the image pick-up apparatus 20 performs long time exposure. User designates (instructs), by the number of frames, charge storage time of charges stored at photo-diodes of the CCDs 1a, 1b, 1c of the CCD type image pick-up device 1 as exposure time inputted from the user interface 8. For example, since one frame is 1/30 sec., when the number of frames is assumed to be 3 (three), charge storage time becomes equal to 1/30 sec.×3=1/10 sec.

When the charge storage time is designated (instructed) by user from the user interface 8, the operation mode of the image pick-up apparatus 20 is switched into long time exposure mode.

The CPU 9 is a control unit for supervisorily controlling the image pick-up apparatus 20. The CPU 9 controls operations of various functions of the image pick-up apparatus 20 in accordance with command inputted from the user interface 8.

The CPU 9 delivers a gain control signal to the gain variable amplifier 3 in accordance with gain quantity inputted from the user interface 8 to conduct a control so as to adjust gain of video signals outputted from the CDSs 2a, 2b, 2c. Moreover, the CPU 9 outputs, to the timing generating circuit 10, a mode control signal for designating either the first mode or the second mode which is mode where charges are read out from the CCDs 1a, 1b, 1c in accordance with gain quantity inputted from the user interface 8.

Figure 2:
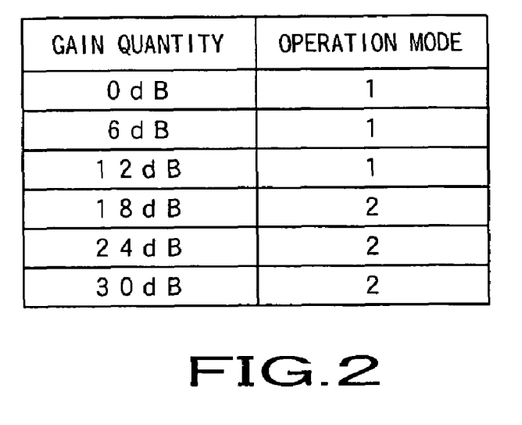
FIG. 2 is a view showing one example of the relationship between first mode and second mode which are switched in accordance with gain quantity.

The CPU 9 designates mode where charges are read out from the CCDs 1a, 1b, 1c in accordance with the gain quantity by using, e.g., table as shown in FIG. 2. As shown in FIG. 2, in the case where gain quantity is the order of low gain such as 0 dB, 6 dB or 12 dB, the CPU 9 designates the first mode. In the case where gain quantity is the order of high gain such as 18 dB, 24 dB or 30 dB, the CPU 9 designates the second mode.

This is because since it is considered that the fact that low gain is designated implies that object has sufficient brightness so that he desires image of high picture quality, the first mode having high vertical resolution is designated.

Moreover, since it is considered that the fact that high gain is designated implies that brightness of object is insufficient so that user desires to pick up image of object by any means even if noise is included to a little degree, the second mode where the vertical resolution is low, but image pick-up operation can be made at a high sensitivity is designated. In addition, when high gain is provided, since noises becomes many, even if the vertical resolution is deteriorated, it is not so conspicuous. Accordingly, the second mode becomes effective.

Furthermore, the CPU9 outputs, to the timing generating circuit 10, a mode control signal which designates either the first mode or the second mode serving as mode where charges are read out from the CCDs 1a, 1b, 1c in accordance with charge storage time inputted from the user interface 8.

Figure 3:
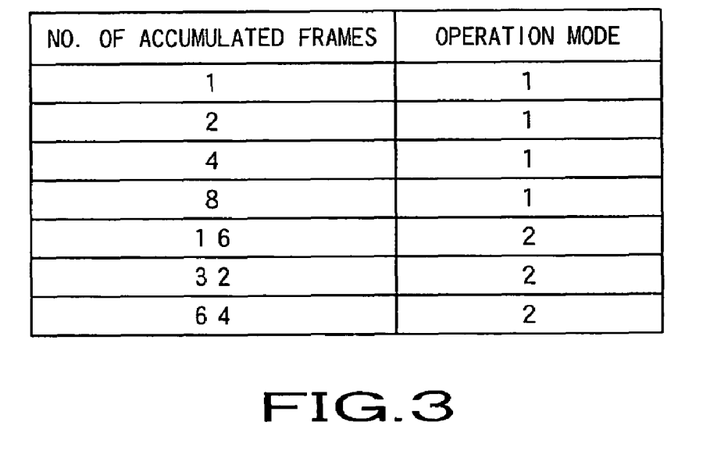
FIG. 3 is a view showing one example of the relationship between first mode and second mode which are switched in accordance with charge storage time.

The CPU9 designates the mode where charges are read out from the CCDs 1a, 1b, 1c in accordance with charge storage time by using, e.g., table as shown in FIG. 3. As shown in FIG. 3, in the case where the charge storage time is relatively short time corresponding to 1 (one) frame, 2 (two) frames, 4 (four) frames or 8 (eight) frames, the CPU9 designates the first mode. In the case where charge storage time is long time corresponding to 16 frames, 32 frames or 64 frames, the CPU9 designates the second mode. In the second mode, since charges of odd lines and charges of even lines of the CCDs 1a, 1b, 1c are added so that digital video signals of even field and odd field are provided, in the case where the same charge storage time as that of the first mode is set, the sensitivity becomes double.

In view of the above, since it is considered that in the case where charge storage time is reduced, user does not so desire to require sensitivity, the CPU9 designates the first mode where sensitivity is lower than that in the second mode, but vertical resolution is high. In addition, since it is considered that in the case where charge storage time is elongated, user desires image of high sensitivity, the CPU9 designates the second mode where vertical resolution is low, but image pick-up operation can be made at a high sensitivity.

Figure 4:
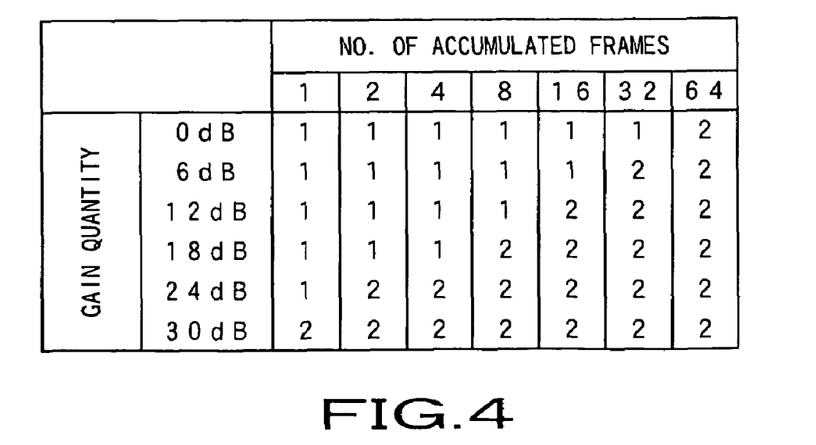
FIG. 4 is a view showing one example of the relationship between first mode and second mode which are switched in accordance with gain quantity and charge storage time.

Moreover, the CPU9 not only performs designation of the first mode or the second mode corresponding to gain quantity, and designation of the first mode or the second mode corresponding to charge storage time by itself as described above, but also performs designation of the first mode or the second mode with gain quantity and charge storage time being as parameter as shown in FIG. 4, for example.

As shown in FIG. 4, trend in which the first mode and the second mode are designated is in conformity with FIGS. 2 and 3, wherein there is designated the second mode where according as gain quantity is increased, high sensitivity can be obtained, and there is designated the second mode where according as charge storage time is increased, high sensitivity can be obtained.

Meanwhile, in general, in the case where charges are stored into CCD for a long time, the influence by dark current becomes large, but there are many cases where influence of dark current of odd lines and that of even lines of two-dimensionally arranged photo-detectors that the CCD has are different from each other. This results from the structure of the CCD, etc. When influence of dark current at odd lines and that at even lines are different from each other, dark levels of video signals determined by charges which have been read out from respective lines also greatly differ from each other. Accordingly, in the case where such charges stored for a long time in the CCD are read out in the first mode, image very difficult to see is outputted by sudden change of the dark level. It is known that such a phenomenon becomes more conspicuous when gain quantity is increased.

Accordingly, when switching between the first mode and the second mode is performed by the gain quantity and the charge storage time as shown in FIG. 4, this approach can also cope with the problems taking place by the characteristic from such a structural point of view of CCD thus to have ability to acquire more fine image having optimum sensitivity.

It is to be noted that values shown in FIGS. 2, 3 and 4 are all examples, and may be also entirely different values except that there results the trend in which the second mode is designated by the CPU9 followed by increase of the gain quantity and increase of the charge storage time and the present invention is not limited by values shown in FIGS. 2, 3 and 4.

The timing generating circuit 10 generates read out pulse signals (CCD read out pulses) for controlling read-out timings of charges stored in the CCDs 1a, 1b, 1c in accordance with mode control signal outputted from the CPU9 to deliver the read-out pulse signals to the CCDs 1a, 1b, 1c.

A vertical drive pulse φV and a horizontal drive pulse φH for taking out charges stored at two-dimensionally arranged photo-detectors of the CCDs 1a, 1b, 1c by performing vertical transfer and horizontal transfer are also delivered from the timing generating circuit 10.

Moreover, at the image pick-up apparatus 20, in the case where there results long time exposure mode where long time exposure is performed, the timing generating circuit 10 generates a read-out mask signal (Readout_Mask) for switching the switch 11 so that read-out pulse signal is not delivered to the CCDs 1a, 1b, 1c in order to store charges by the time designated from user at photo-detectors of the CCDs 1a, 1b, 1c in accordance with a mode control signal outputted from the CPU9.

Further, in the long time exposure mode, the timing generating circuit 10 performs control of ON/OFF of the bus switch 5, and control for writing digital video signal into the frame memory 6 and for reading out digital video signal which has been written therein.

Such image pick-up apparatus 20 switches read-out mode of charges stored in the CCDs 1a, 1b, 1c from the first mode where image having high vertical resolution is obtained to the second mode where image having high sensitivity is obtained in accordance with increase of gain quantity and increase of charge storage time (exposure time) by control of the CPU9.

Subsequently, the operation of the image pick-up apparatus 20 in the case where the first mode serving as the mode where frame read-out operation is performed is designated by the CPU9 in the long time exposure mode, and the operation of the image pick-up apparatus 20 in the case where the second mode serving as mode where field read-out operation is performed is designated by the CPU9 similarly in the long time exposure mode will be explained by using the timing charts shown in FIGS. 5 and 8.

First, the operation of the image pick-up apparatus 20 in the case where the first mode is designated will be explained by using the timing charts shown in FIGS. 5A to 5I. It is to be noted that storage time of charges stored (accumulated) in the CCDs 1a, 1b, 1c is set to storage time corresponding to 3 (three) frames.

Figure 5A:
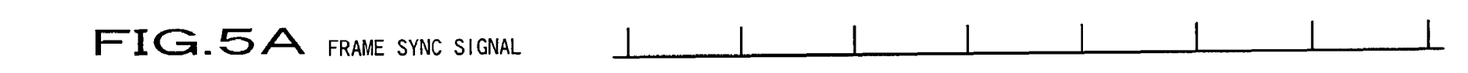
FIGS. 5A to 5I are timing charts for explaining the operation of the image pick-up apparatus in reading out stored charges in the first mode in the case of long time storage mode.
Figure 5B:
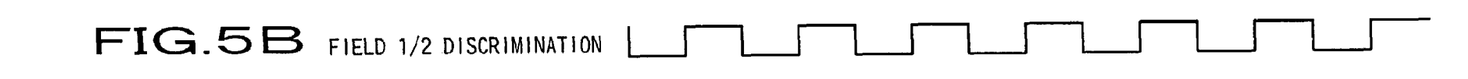
Figure 5C:
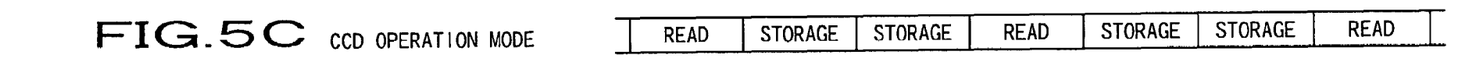

A frame synchronizing signal shown in FIG. 5A is a signal indicating start of frame, and a field ½ discrimination signal shown in FIG. 5B is a pulse signal indicating odd field at present at Low time period of the pulse signal and indicating even field at present at High time period thereof. The CCD operation mode shown in FIG. 5C indicates what operation the CCDs 1a, 1b, 1c perform at present.

Figure 5D:
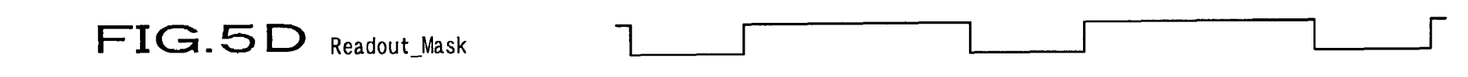
Figure 5E:
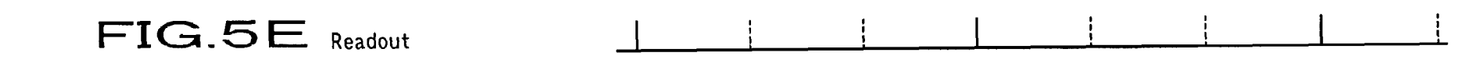
Figure 5F:
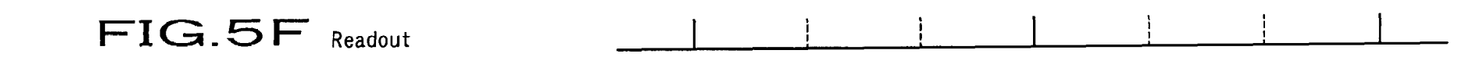

A read-out mask signal shown in FIG. 5D indicates a signal outputted from the timing generating circuit 10 to the switch 11, and read-out pulse signals of FIGS. 5E and 5F are signals outputted from the timing generating circuit 10 to the CCDs 1a, 1b, 1c through the switch 11 and for designating read-out timing of stored charges. A read-out signal shown in FIG. 5E is a signal delivered for the purpose of reading out charges from photo-diodes of even lines of the CCD 1a, 1b, 1c, and a read-out signal shown in FIG. 5F is a signal delivered for the purpose of reading out charges from photo-diodes of odd lines.

Figure 5G:
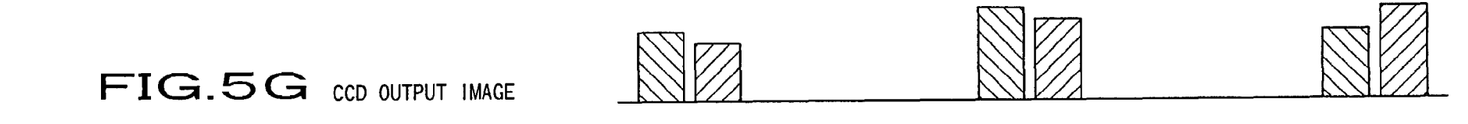
Figure 5H:
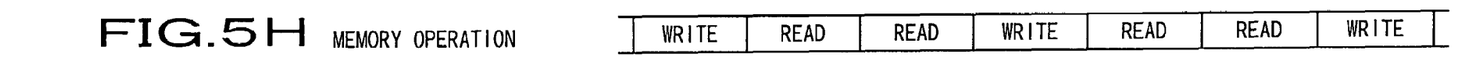
Figure 5I:
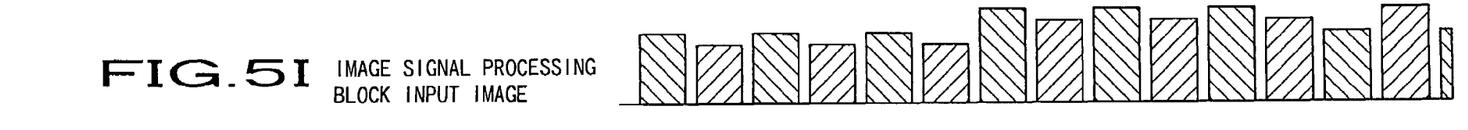

FIG. 5G shows image of a video signal by charges which have been read out from the CCDs 1a, 1b, 1c. FIG. 5H shows the operating state of the frame memory 6, and FIG. 5I shows image of a video signal inputted to the image signal processing block 7.

As shown in FIGS. 5E, 5F, there is outputted, from the timing generating circuit 10, a read-out signal for reading out odd lines of photo-diodes of the CCDs 1a, 1b, 1c at odd field time period, and for reading out even lines of photo-diodes of the CCDs 1a, 1b, 1c at even field time period.

In this example, portions indicated as dotted lines in FIGS. 5E and 5F indicate phase of read-out pulse signal which might be outputted in the case where the read-out pulse signal is not masked by the read-out mask signal.

Moreover, as shown in FIG. 5D, the timing generating circuit 10 outputs a read-out mask signal so that the read-out signal becomes valid once every three frames. The read-out mask signal outputted from the timing generating circuit 10 is delivered to the switch 11 thus to apply limitation so that read-out signal is not delivered to the CCDs 1a, 1b, 1c at High time period.

Thus, at the Low time period of the read-out mask signal, a read-out signal is delivered to the CCDs 1a, 1b, 1c through the switch 11. Thus, as shown in FIG. 5G, video signals by charges stored at odd lines and video signals by charges stored at even lines are respectively read out every three frames.

Further, the timing generating circuit 10 controls the bus switch 5 at Low time period of the read-out mask signal to turn the bus switch 5 ON to further output a signal which permits write operation of a video signal (write enable signal) into the frame memory 6 as shown in FIG. 5H.

Video signals which have been read out from the CCDs 1a, 1b, 1c are delivered to the frame memory 6 and the image signal processing block 7 as shown in FIG. 5I through the CDS 2, the gain variable amplifier 3, the A/D converter 4 and the switch 5.

Figure 6:
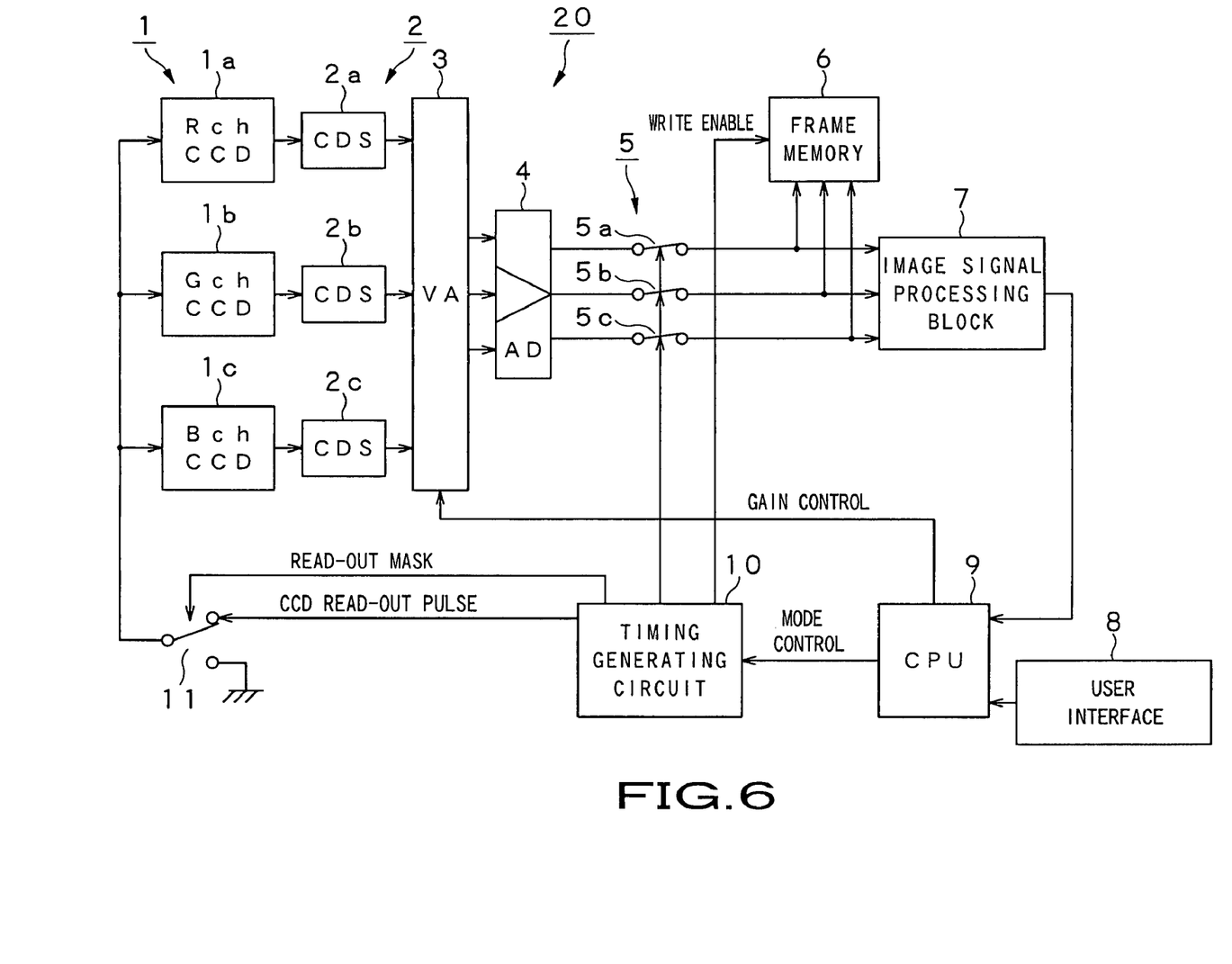
FIG. 6 is a view showing the state of the image pick-up apparatus in the case where read-out mask signal is at Low time period.

The state of the image pick-up apparatus 20 at Low time period of the read-out mask signal is shown in FIG. 6. At Low time period of the read-out mask signal, a read-out pulse signal is delivered from the timing generating circuit 10 to the CCDs 1a, 1b, 1c through the switch 11. As a result, the bus switch 5 is also turned ON. Thus, the write enable signal is delivered from the timing generating circuit 10 to the frame memory 6.

On the other hand, at High time period of the read-out mask signal, the timing generating circuit 10 controls the bus switch 5 to turn the bus switch 5 OFF to further output a signal which permits read-out operation of a video signal (read enable signal) stored in the frame memory 6 as shown in FIG. 5H.

Thus, delivery from the A/D converter 4 to the image signal processing block 7 is interrupted. As a result, video signals stored in the frame memory 6 are read out, and are delivered to the image signal processing block 7.

Figure 7:
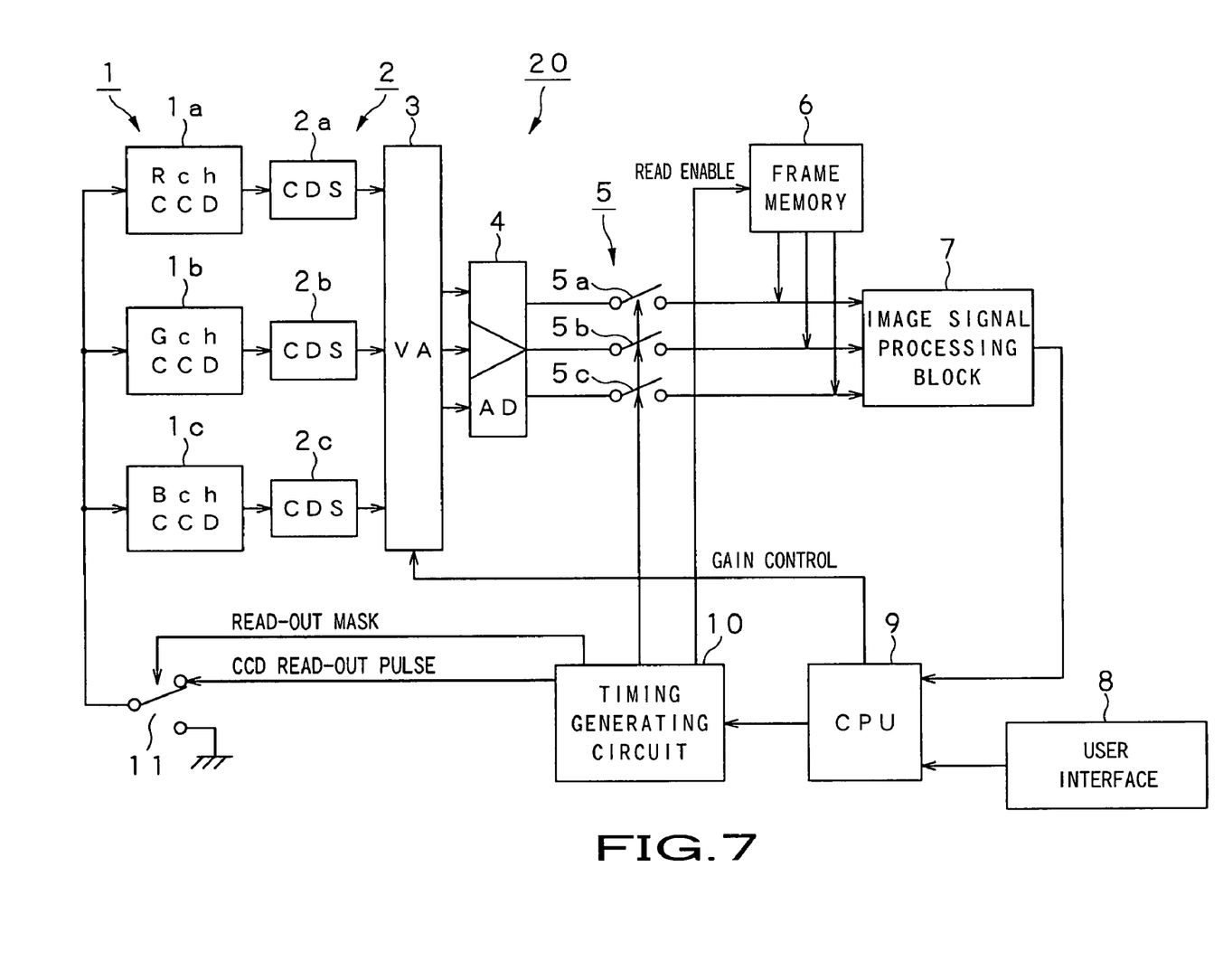
FIG. 7 is a view showing the state of the image pick-up apparatus in the case where read-out mask signal is at High time period.

The state of the image pick-up apparatus 20 at High time period of read-out mask signal is shown in FIG. 7. At the High time period of the read-out mask signal, read-out pulse signal from the timing generating circuit 10 is not delivered to the CCDs 1a, 1b, 1c. As a result, the bus switch 5 is also turned OFF. Thus, the read enable signal is delivered from the timing generating circuit 10 to the frame memory 6.

In a manner as stated above, by control of the timing generating circuit 10, video signals by charges which have been read out respectively every three frames from odd lines and even lines of the CCDs 1a, 1b, 1c in which charges corresponding to three frames are stored are delivered to the image processing block 7, and the same video signals are delivered at the remaining two frames from the frame memory 6 so that they are should be complemented.

Then, the operation of the image pick-up apparatus 20 in the case where the second mode is designated will be explained by using the timing charts shown in FIGS. 8A to 8I. In this example, storage time of charges stored in the CCDs 1a, 1b, 1c is set to storage time corresponding three frames (=six fields). Since the explanation of signals shown in FIGS. 8A to 8I corresponds to the explanation of FIGS. 5A to 5I, the detail thereof will be omitted.

Figure 8A:
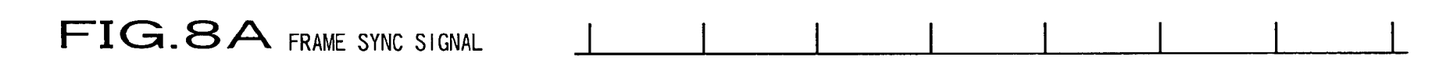
FIGS. 8A to 8I are timing charts for explaining the operation of the image pick-up apparatus in reading out stored charges in the second mode in the case of the long time storage mode.
Figure 8B:
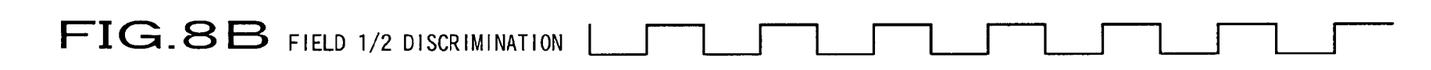
Figure 8C:
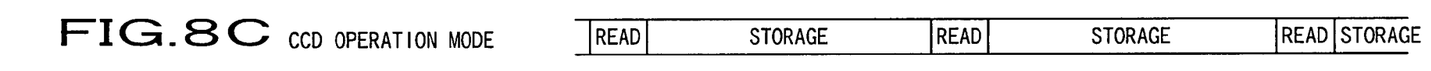
Figure 8D:
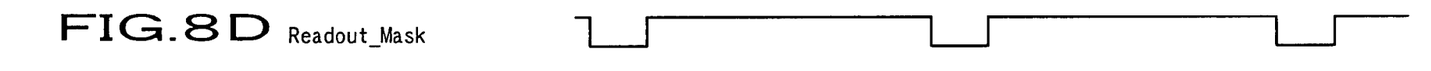
Figure 8E:
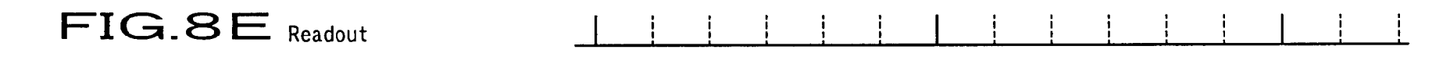
Figure 8F:
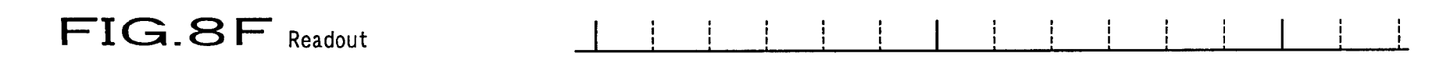

As shown in FIGS. 8E and 8F, there is outputted, from the timing generating circuit 10, a read-out signal for reading out odd lines of photo-diodes of the CCDs 1a, 1b, 1c at the odd field time period, and for reading out even lines of photo-diodes of the CCDs 1a, 1b, 1c similarly at the odd field time period.

In this example, portions indicated as dotted lines in FIGS. 8E and 8F indicate phases of read-out pulse signal which might be outputted in the case where the read-out pulse signal is not masked by the read-out mask signal.

Moreover, as shown in FIG. 8D, the timing generating circuit 10 outputs a read-out mask signal so that the read-out signal becomes valid once every six fields. The read-out mask signal outputted from the timing generating circuit 10 is delivered to the switch 11 to apply limitation so that read-out signal is not delivered to the CCDs 1a, 1b, 1c at High time period.

Figure 8G:
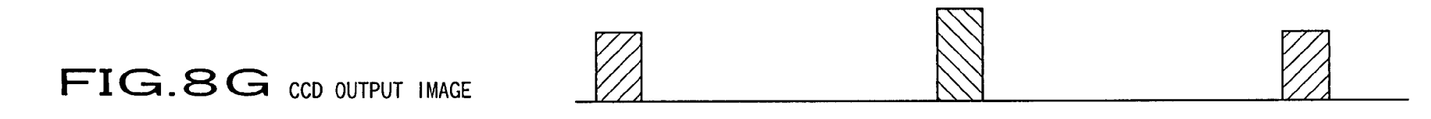

Thus, a read-out signal is delivered through the switch 11 to the CCDs 1a, 1b, 1c at Low time period of the read-out mask signal. As shown in FIG. 8G, video signals by charges stored at odd line and video signals by charges stored at even lines are read out every six fields and are added.

Figure 8H:
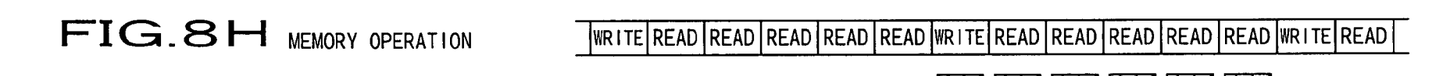

Moreover, the timing generating circuit 10 controls the bus switch 5 at Low time period of the read-out mask signal to turn the bus switch 5 ON to further output a signal which permits write operation of video signal (write enable signal) into the frame memory 6 as shown in FIG. 8H.

Figure 8I:
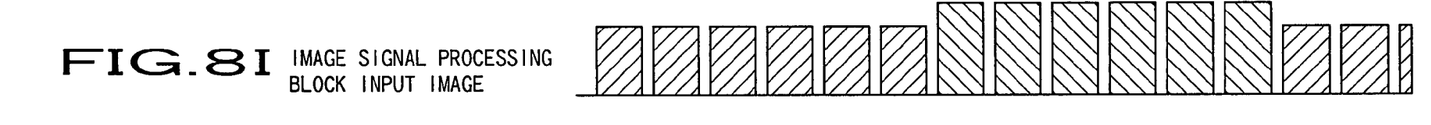

The video signals which have been read out from the CCDs 1a, 1b, 1c are delivered to the frame memory 6 and the image signal processing block 7 as shown in FIG. 8I through the CDS2, the gain variable amplifier 3, the A/D converter 4 and the switch 5.

The state of the image pick-up apparatus 20 at Low time period of the read-out mask signal is shown in FIG. 6. At the Low time period of the read-out mask signal, a read-out pulse signal is delivered from the timing generating circuit 10 to the CCDs 1a, 1b, 1c through the switch 11. As a result, the bus switch 5 is also turned ON. Thus, the write enable signal is delivered from the timing generating circuit 10 to the frame memory 6.

On the other hand, at High time period of the read-out mask signal, the timing generating circuit 10 controls the bus switch 5 to turn the bus switch 5 OFF to further output a signal which permits read-out operation of a video signal (read enable signal) stored in the frame memory 6 as shown in FIG. 8H.

Thus, delivery from the A/D converter 4 to the image signal processing block 7 is interrupted. Thus, the video signals stored in the frame memory 6 are read out, and are delivered to the image signal processing block 7.

The state of the image pick-up apparatus 20 at High time period of the read-out mask signal is shown in FIG. 7. At High time period of the read-out mask signal, read-out pulse signals from the timing generating circuit 10 are not delivered to the CCDs 1a, 1b, 1c. As a result, the bus switch 5 is also turned OFF. Thus, the read enable signal is delivered from the timing generating circuit 10 to the frame memory 6.

In a manner as stated above, by control of the timing generating circuit 10, video signals by charges which have been read out and have been added every six fields from odd lines and even lines of the CCDs 1a, 1b, 1c where charges corresponding three frames (=six fields) are stored are delivered to the image processing block 7, and the same video signals are delivered from the frame memory 6 at the remaining five fields so that they should be complemented.

In a manner as stated above, in the long time exposure mode, the image pick-up apparatus 20 can read out charges stored in the CCD 1a, 1b, 1c in the first mode or the second mode.

It is to be noted that while adjustment of gain quantity is controlled by the gain variable amplifier 3 in accordance with gain quantity inputted from the user interface 8 by user in the image pick-up apparatus 20 according to the present invention, AGC (Auto Gain Controller) may be provided in place of gain variable amplifier 3 to thereby adjust gain in dependency upon the photographic (image pick-up) condition, etc. The CPU9 outputs a mode control signal to the timing generating circuit 10 so that in the case where gain quantity adjusted by AGC is low, the first mode is designated, while in the case where gain quantity is high, the second mode is designated.

Furthermore, while designation of the first mode and the second mode in the image pick-up apparatus 20 according to the present invention is automatically performed by the policy prescribed by, e.g., the tables shown in FIGS. 2, 3 and 4 which are set at the CPU9 on the basis of gain quantity and charge storage time which are inputted from the user interface 8, user may directly designate the first mode or the second mode from the user interface 8.

It is to be noted that while the present invention has been described in accordance with certain preferred embodiments illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

As described above, in the present invention, image pick-up operation is performed in such a manner to perform switching into the first mode serving as image pick-up mode where charges stored in the solid-state image pick-up device are read out every frames in accordance with image pick-up request at low output sensitivity, and to perform switching into the second mode serving as image pick-up mode where charges stored in the solid-state image pick-up device are read out every fields in accordance with image pick-up request at high output-sensitivity to add odd charges and even charges which are adjacent in a vertical direction of the charges which have been read out while changing the combination thereof every fields to output the charges thus added. Accordingly, it becomes possible to pick up image of object so that there results optimum image at output sensitivity that user desires.

For example, in the case where the gain of image pick-up signal is increased because light quantity of object is insufficient, switching into the second mode is performed. In the second mode, since the charge storage time by which there results the same sensitivity can be halved as compared to the first mode, it becomes possible to acquire image which also satisfies required output sensitivity while suppressing movement or vibration of moving object.

Moreover, in the case where there is no necessity to particularly increase sensitivity because light quantity of object is sufficient, switching into the first mode is performed, thereby making it possible to acquire image of high picture quality having vertical resolution higher than that in the case where image pick-up operation is performed in the second mode.

Furthermore, in the case where charge storage time during which charges are stored in the solid-state image pick-up device is increased to increase output sensitivity, switching into the second mode is performed, thereby making it possible to obtain double output sensitivity in the same charge storage time as that in the first mode, i.e., to halve the charge storage time. Accordingly, deterioration of the picture quality by movement or vibration of moving object is optically adjusted, thereby making it possible to acquire image of required output sensitivity while minimizing such deterioration.

The invention claimed is:

1. An image pick-up apparatus comprising:

a solid-state image pick-up device for performing photo-electric conversion in accordance with a received image pick-up light;

switching means for performing switching between first mode serving as image pick-up mode where charges stored in the solid-state image pick-up device are read-out every n (n is natural number) frames to output a CCD (Charge Coupled Device) output signal and second mode serving as image pick-up mode where charges stored in the solid-state image pick-up device are read-out every m (m is natural number) fields to add odd charges and even charges which are adjacent in a vertical direction of the charges which have been readout while changing the combination thereof every m fields to output a CCD (Charge Coupled Device) output signal;

storage means for storage of the output CCD output signals from the image pick-up device;

control mean for controlling the switching means in such a manner to switch the image pick-up mode of the image pick-up apparatus into the first mode in accordance with image pick-up request at a low output sensitivity, and to switch the image pick-up mode of the image pick-up apparatus into the second mode in accordance with image pick-up request at a high output sensitivity; and timing generating means, directly connected to the storage means, for controlling readout of the output CCD output signals as motion video signals of a moving image from the image pick-up device and for controlling storage and output of the storage means, wherein at every frame in the first mode or at every field in the second mode, during non-readout of the image pick-up device, the storage means outputs a same CCD output signal as the motion video signals of the moving image.

2. The image pick-up apparatus as set forth in claim 1, comprising:

gain adjustment means for adjusting gain of an image pick-up signal outputted from the solid-state image pick-up device, wherein the control means controls the switching means so as to switch the image pick-up mode of the image pick-up apparatus into either the first mode or the second mode in accordance with the gain adjusted by the gain adjustment means.

3. The image pick-up apparatus as set forth in claim 1, wherein the control means controls the switching means so as to switch the image pick-up mode of the image pick-up apparatus into either the first mode or the second mode in accordance with storage time of the charges stored in the solid-state image pick-up device.

4. An image pick-up method comprising:
performing photoelectric conversion by a solid-state image pick-up device in accordance with a received image pick-up light;
performing switching into first mode serving as image pick-up mode where charges stored in the solid-state image pick-up device are readout every n (n is natural number) frames in accordance with image pick-up request at a low output sensitivity to output a CCD (Charge Coupled Device) output signal;
performing switching into second mode serving as image pick-up mode where charges stored in the solid-state image pick-up device are readout every m (m is natural number) fields in accordance with image pick-up request at a high output sensitivity to add odd charges and even charges which are adjacent in a vertical direction of the charges which have been readout while changing the combination thereof every m fields to output a CCD (Charge Coupled Device) output signal, thus to perform image pick-up operation; and
performing control of readout the CCD output signals as motion video signals of a moving image from the image pick-up device and performing control of storage and output of the CCD output signals for a storage means by a timing generating means directly connected to the storage means, wherein at every frame in the first mode or at every field in the second mode, during non-readout of the image pick-up device, the storage means outputs a same CCD output signal as the motion video signals of the moving image.

5. The image pick-up method as set forth in claim 4, comprising:
adjusting gain of an image pick-up signal outputted from the solid-state image pick-up device to switch the image pick-up mode into either the first mode or the second mode in accordance with the adjusted gain to perform image pick-up operation.

6. The image pick-up method as set forth in claim 4, comprising:
switching the image pick-up mode into either the first mode or the second mode in accordance with storage time of the charges stored in the solid-state image pick-up device to perform image pick-up operation.

7. The image pick-up apparatus set forth in claim 1, further comprising an image processing means for processing the charges output from the solid-state image pick-up device during the first time period and for processing the charges output from the storage means during the second time period.

8. The image pick-up method as set forth in claim 4, further comprising processing the charges output from the solid-state image pick-up device during the first period and processing the charges output from the storage means during the second time period.

* * * * *